(12) United States Patent
Kisaka

(10) Patent No.: US 7,203,022 B2
(45) Date of Patent: Apr. 10, 2007

(54) DISK DEVICE, AND POSITIONING CONTROL METHOD AND SIGNAL-PROCESSING CIRCUIT FOR HEAD

(75) Inventor: Masashi Kisaka, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

(21) Appl. No.: 11/143,392

(22) Filed: Jun. 1, 2005

(65) Prior Publication Data

US 2005/0270686 A1 Dec. 8, 2005

(30) Foreign Application Priority Data

Jun. 2, 2004 (JP) .............................. 2004-164535

(51) Int. Cl.
*G11B 5/596* (2006.01)
(52) U.S. Cl. .................................... 360/77.02
(58) Field of Classification Search ...................... None
See application file for complete search history.

(56) References Cited

U.S. PATENT DOCUMENTS 6,104,559 A 8/2000 Sakai 6,388,596 B1 * 5/2002 Sandusky ................... 341/132

FOREIGN PATENT DOCUMENTS

| JP | 07-141807 | 6/1995 |
|----|-----------|--------|
| JP | 08-203226 | 8/1996 |
| JP | 11-185203 | 7/1999 |

* cited by examiner

*Primary Examiner*—Hoa T. Nguyen
*Assistant Examiner*—Mitchell Slavitt
(74) *Attorney, Agent, or Firm*—Townsend and Townsend and Crew LLP

(57) ABSTRACT

Embodiments of the invention eliminate noise from burst signals by use of a reliable and simple method. In one embodiment, the read processor of the HDD has a noise elimination circuit. The noise elimination circuit retains multiple integral values of the waveform absolute values for each period in the burst signals read out from the head, then removes a maximum value and/or a minimum value from the multiple integral values, and transmits the remainder as noise-eliminated signal data. The noise elimination circuit is a circuit for eliminating noise from an N number of periods of burst signal data, and this circuit integrates the absolute values of the waveforms for each period in the N number of periods of burst signal data, compares the integral values of each period with one another, and outputs the remainder obtained by removing the maximum and minimum integral values, to the servo data decoder of the following stage.

17 Claims, 8 Drawing Sheets

(a)

(a)

(b)

DISK DEVICE, AND POSITIONING CONTROL METHOD AND SIGNAL-PROCESSING CIRCUIT FOR HEAD

CROSS-REFERENCES TO RELATED APPLICATIONS

This application claims priority from Japanese Patent Application No. JP2004-164535, filed Jun. 2, 2004, the entire disclosure of which is incorporated herein by reference.

BACKGROUND OF THE INVENTION

The present invention relates to a disk device that uses servo signals to conduct positioning control of a head, to a positioning control method for the head, and to a signal-processing circuit provided in the disk device in order to conduct a noise elimination process on the servo signals. More particularly, the invention relates to a disk device suitable for eliminating the impulse noise (and the like) superimposed on servo signals for reasons such as a disturbance, and to a positioning control method and signal-processing circuit for a head of the disk device.

The devices that use various forms of media, such as an optical disk or a magnetic recording tape, are known as data storage devices. Among them, a hard-disk drive (HDD) is most commonly used as a storage device in a computer, and is one of the storage devices indispensable in today's computer systems. In addition, the applications of the HDD, because of its excellent characteristics, are increasingly expanding not only in the computer field, but also as the removable memories (and the like) used in dynamic image recording/reproducing apparatus, car navigation systems, or digital cameras.

Such a data storage device, for example, a magnetic disk device that uses a head to read and write data, typically employs the so-called sector servo scheme. The sector servo scheme conducts positioning control of the head in accordance with servo data including a plurality of burst signals recorded in the servo regions of the servo sectors arranged on the disk.

Along with the enhancement of recording density in recent years, a magnetoresistive (MR) head utilizing an MR effect, a giant magnetoresistive (GMR) head utilizing a GMR effect, and an MR reading/thin-film recording composite head (hereinafter, referred to simply as the MR head) are coming to be used in magnetic disk devices. The MR head, as its head configuration exhibiting an excellent effect in the suppression of thermal asperity due to contact with a medium, records data using a thin-film head and reads the data by using a dual-stripe magnetoresistive (DSMR) head equipped with two MR elements.

By the way, in the MR head, if the magnetic sensitivity of the MR elements forming the MR head suddenly changes, this may cause so-called Barkhausen noise due to the superimposition of irregular noise on head read output. Noise due to an electrostatic discharge (ESD) caused by a disturbance may also occur, since the thin-film head, the MR elements, and the like are used in the head section. If such noise actually occurs, head position information that is to be originally derived from read-back signals of burst data will not correctly reflect the position of the head. Consequently, the positioning of the head will be impossible. With respect to this problem, for example, Japanese Patent Laid-open No. Hei 11-185203 (Patent Document 1) described below discloses a data read/write device that automatically detects the occurrence of irregular noise superimposition such as Barkhausen noise.

For the read/write device described in Patent Document 1, when positioning control of the head is to be conducted in a sector servo scheme using the burst signals A, B, C, and D contained in servo data, whether noise is superimposed on the burst signals is determined using burst outputs A to D that are the peak values of burst signals A to D. If noise is determined to be superimposed, write operation will be prohibited. The sum of the burst signals (i.e., A+B+C+D) is therefore used. More specifically, either the sum of the burst signals last determined to be free from the superimposition of irregular noise, or a predetermined expected value is held, the difference between the sum of the previous burst signals or the expected value and the sum of the current burst signals is calculated. If this difference is greater than a predetermined threshold value, write operation will be prohibited.

Also, even higher accuracy of head position detection is being demanded with the increases of BPI (Bits Per Inch) and improvement of TPI (Tracks Per Inch) in magnetic disks in recent years. Accordingly, instead of the so-called peak hold scheme where the position of the head is detected from such peak values of servo signals as mentioned above, the so-called area servo scheme where the waveform absolute values of servo signals are integrated and the head position is detected using the results of the integration, is used to conduct position control. The area servo scheme is described in, for example, Japanese Patent Laid-open No. Hei 10-255415 (Patent Document 2).

In this scheme, a servo detection circuit also detects the servo signals gain-adjusted by an automatic gain control (AGC) circuit provided at the preceding stage. Then, the servo detection circuit detects the current position of the magnetic head by use of burst signals contained in servo data, generates an error signal, and outputs the error signal to a controller. FIG. 10 is a block diagram showing the servo detection circuit described in Patent Document 2. As shown in FIG. 10, servo detection circuit 500 includes: a full-wave rectifier 501 for full-wave rectifying servo burst signals; an integrating circuit 502 for integrating the full-wave rectified servo burst signals; an A/D converter 503 for converting into digital data the integral value obtained by the integrating circuit 502; a zero-cross detector 504 for detecting the zero-cross points of gain-adjusted servo burst signals; and an integration control circuit 505 for counting the number of zero-cross points of servo burst signals received, and controlling the integrating circuit 502 so that when the count value reaches a previously set value, the integral value within the integrating circuit 502 will be held.

Servo signals are repeatedly recorded at predetermined periods, and the servo detection circuit 500 outputs, for example, 10 periods of burst signal integral data in accordance with the detection results obtained by the zero-cross detector 504. The controller at the following stage controls the positioning of the head by using, for example, the difference in integral value between bursts signal A and B. If noise is superimposed in the vicinity of the zero-cross point of a burst signal, it will not be possible for an accurate number of periods of integral data to be output, partly because the noise may be mis-counted as a zero-cross point. Therefore, according to Patent Document 2, not only zero-cross points are counted, but also is performed a process in which, during the time interval from the start of zero-cross point counting to the elapse of a predetermined time, integration is not stopped even if the count value exceeds the desired value.

BRIEF SUMMARY OF THE INVENTION

In the technology described in Patent Document 1, either the sum of the burst signals last determined to be free from the superimposition of noise, or the value expected when no noise is superimposed is predetermined as a comparison value for comparison with the sum of the current burst signals. The comparison value is also difficult to provide or hold beforehand. In other words, the problem occurs that since the sum of burst outputs (i.e., A+B+C+D), serving as the above comparison value, varies, for example, from disk to disk or from device to device, it is not easy to confirm whether noise is superimposed on the burst outputs, or to provide a predetermined value beforehand as the comparison value by, for example, performing an estimation.

In addition, the head position control method of the area servo scheme has the problem that even if noise is superimposed on burst signals, since these signals are added in the integrating circuit, positioning control of the head will be conducted using an integrated value of the noise-superimposed signals and accurate positioning control will therefore be virtually impossible. Furthermore, this control method has the problem that as in Patent Document 1, even if a comparison is to be conducted with respect to the comparison value used when there is no noise, the comparison value is very difficult to set, as described above.

The present invention was made in order to solve the above problems, and it provides: a disk device capable of eliminating noise from burst signals by use of a reliable and simple method; a positioning control method for a head of such a disk device; and a signal-processing circuit capable of eliminating the noise from the burst signals.

According to one aspect of the present invention, a disk device that conducts positioning control of a head in accordance with a servo signal containing a plurality of burst signals recorded in a servo region located on a disk, includes: a noise elimination block that retains a predetermined number of periods of integral data of absolute values of waveforms for each period in the burst signals read out from the above-mentioned head, then removes, from the predetermined number of periods of integral data, a maximum value and/or minimum value thereof, and outputs a remainder as noise-eliminated signal data; and a controller that conducts positioning control of the head in accordance with the noise-eliminated signal data.

In the above disk device of the present invention that conducts positioning control of the head by use of a sum of and/or a difference between integral data of burst signals contained in a servo signal, period-by-period integral values of the burst signals usually recorded multiple times repeatedly are retained, the remainder obtained by removing a maximum value, a minimum value, or both thereof, from the above integral values is taken as noise-eliminated data, and positioning control of the head is executed in accordance with the noise-eliminated data. Accordingly, even if ESD noise and the like are superimposed on burst signals and associated integral values become greater or smaller than values originally obtainable, it is possible to remove the noise-affected integral values and hence to conduct positioning control of the head by using a noiseless servo signal.

In addition, the above-mentioned noise elimination block can output as the above-mentioned noise-eliminated data the remainder obtained by removing, from the predetermined number of periods of integral data, a maximum value and minimum value thereof, and removal of the maximum value and the minimum value allows structural simplification of the noise elimination block.

Furthermore, the above-mentioned noise elimination block can calculate arranged data of absolute values of waveforms for each period in the burst signals, and output as the above-mentioned noise-eliminated data the remainder obtained by, when the predetermined number of periods of integral data is arranged in order of the magnitude thereof from a maximum value to a minimum value, removing from the predetermined number of periods of integral data, a predetermined number of integral values in order of decreasing magnitude from the maximum value, and a predetermined number of integral values in order of increasing magnitude from the minimum value. Thus, positioning accuracy can be further improved by removing not only the maximum value and the minimum value, but also data close to the maximum and minimum values, and using only data close to an average value.

Furthermore, the noise elimination block can have an integral data storing area for retaining a predetermined number of periods of integral data of absolute values of waveforms for each period in the burst signals, and a comparator for comparing with one another the integral values constituting the predetermined number of periods of integral data retained in the above-mentioned integral data storing area, and outputting as the above-mentioned noise-eliminated data the remainder obtained by removing, from the predetermined number of periods of integral data, a maximum value and/or minimum value thereof.

Moreover, the noise elimination block can have an integral data storing area for retaining a predetermined number of periods of integral data of absolute values of waveforms for each period in the burst signals, a comparator for comparing with one another the integral values constituting the predetermined number of periods of integral data retained by the above-mentioned an integral data storing area, and outputting as the above-mentioned noise-eliminated data the remainder obtained by removing a maximum integral value and a minimum integral value from the predetermined number of periods of integral data, a first storage element for storing only the maximum value of all the predetermined number of periods of integral data, and a second storage element for storing only the minimum value of all the predetermined number of periods of integral data. The foregoing comparator is adapted to: compare two integral values included in the predetermined number of periods of integral data; store the larger of the two values into the above-mentioned first storage element, and store the smaller into the above-mentioned second storage element; compare a remainder with the integral values stored in the first and second storage elements; and if the remainder is greater than the integral value stored in the first storage element, replace this integral value with the remainder, if the remainder is smaller than the integral value stored in the second storage element, replace this integral value with the remainder, or if the remainder is greater than the integral value stored in the first storage element, but smaller than the integral value stored in the second storage element, output the remainder as the above-mentioned noise-eliminated data. Thus, noise-eliminated data can be output by comparing the predetermined number of periods of integral data by use of the above two storage elements. If the above-mentioned remaining data compared with the integral values stored in the first and second storage elements is the same as the integral values within the first and second storage elements, the remaining data can be replaced with the integral values or output as noise-eliminated data.

Furthermore, the noise elimination block can have an integral data storing area for retaining a predetermined number of periods of integral data of absolute values of waveforms for each period in the burst signals, a comparator for comparing with one another the integral values constituting the predetermined number of periods of integral data retained by the above-mentioned integral data storing area, and outputting as the above-mentioned noise-eliminated data the remainder obtained by removing a maximum integral value and a minimum integral value from the predetermined number of periods of integral data, and an output element that averages outputs from the above-mentioned comparator and outputs the resulting average as the noise elimination block. A different number of integral values for each type of burst signal can be calculated by generating an output of an average integral value and outputting the output.

Furthermore, the noise elimination block can be an α-trimmed mean filter for receiving, as inputs, integral values of absolute values of waveforms for each period in the burst signals, wherein noise may be eliminated by means of order statistics filtering with the α-trimmed mean filter or the like.

In another aspect of the present invention, a disk device that conducts positioning control of a head in accordance with a servo signal containing a plurality of burst signals recorded in a servo region located on a disk, includes: a noise elimination block that retains a predetermined number of amplitude values of the burst signals read out from the above-mentioned head, then removes, from the predetermined number of amplitude values, a maximum value and/or minimum value thereof, and outputs a remainder as noise-eliminated signal data; and a controller that conducts positioning control of the head in accordance with the noise-eliminated signal data.

In the above disk device of the present invention that conducts positioning control of the head by use of a sum of and/or a difference between amplitude values of burst signals contained in a servo signal, the amplitude values of the burst signals usually recorded multiple times in a cyclic form are calculated, the remainder obtained by removing a maximum value, a minimum value, or both thereof, from the above amplitude values is taken as noise-eliminated data, and positioning control of the head is executed in accordance with the noise-eliminated data. Accordingly, even if ESD noise and the like are superimposed on burst signals and associated amplitude values become greater or smaller than values originally obtainable, it is possible to remove the noise-affected amplitude values and hence to conduct positioning control of the head by using a noiseless servo signal.

In the above, amplitude can be obtained by, for example, retaining products between a signal "x(nT)", where T is a sampling period, and a sine wave of the same frequency as that of the signal "x(nT)" and taking an average of the products or taking a square of the average.

According to another embodiment of the present invention, a method for positioning a head of a disk device conducting positioning control of the head, in accordance with a servo signal containing a plurality of burst signals recorded in a servo region located on a disk, includes: retaining a predetermined number of periods of integral data of absolute values of waveforms for each period in the burst signals read out by the head; outputting as noise-eliminated data the remainder obtained by removing, from the predetermined number of periods of integral data, a maximum value and/or minimum value thereof; and controlling the positioning of the head in accordance with the above-mentioned noise-eliminated data.

According to an embodiment of the present invention, a method for positioning a head of a disk device conducting positioning control of the head, in accordance with a servo signal containing a plurality of burst signals recorded in a servo region located on a disk, includes: retaining a predetermined number of amplitude values of the burst signals read out by the head; outputting as noise-eliminated data the remainder obtained by removing, from the predetermined number of amplitude values, a maximum value and/or minimum value thereof; and controlling the positioning of the head in accordance with the above-mentioned noise-eliminated data.

According to another embodiment of the present invention, a signal-processing circuit for processing a plurality of burst signals recorded in a servo region located on a disk, in order to conduct positioning control of a head, includes: an integral data storing area for retaining a predetermined number of periods of integral data of absolute values of waveforms for each period in the burst signals read by the head; and an output element for outputting as noise-eliminated data the remainder obtained by removing, from the predetermined number of periods of integral data, a maximum value and/or minimum value thereof.

In the above signal-processing circuit of the present invention, it is possible to output integral data of a servo signal from which noise was eliminated in the above manner, and to execute accurate positioning control of the head by mounting the signal-processing circuit in the disk device.

According to another embodiment of the present invention, a signal-processing circuit for processing a plurality of burst signals recorded in a servo region located on a disk, in order to conduct positioning control of a head, includes: an amplitude calculator for retaining a predetermined number of amplitude values of the burst signals read by the head; and an output element for outputting as noise-eliminated data the remainder obtained by removing a maximum value and/or a minimum value from the predetermined number of amplitude values calculated by the above-mentioned amplitude calculator.

In the above signal-processing circuit of the present invention, it is possible to output amplitude values of a servo signal from which noise was eliminated in the above manner, and to execute accurate positioning control of the head by mounting the signal-processing circuit in the disk device.

According to the first signal-processing circuit of the present invention, even if ESD noise and the like are superimposed on burst signals and associated integral data become greater or smaller than data originally obtainable, it is possible to remove the noise-affected integral data and hence to conduct positioning control of the head by using a noiseless servo signal.

Additionally, according to the disk devices and disk device head control methods of the present invention, positioning accuracy of the head improves since, when positioning control of the head is executed, remainder obtained by removing a maximum value, a minimum value, or both thereof, from integral data or amplitude data of burst signals for each period can be used as noise-eliminated data.

DETAILED DESCRIPTION OF THE INVENTION

Figure 1:
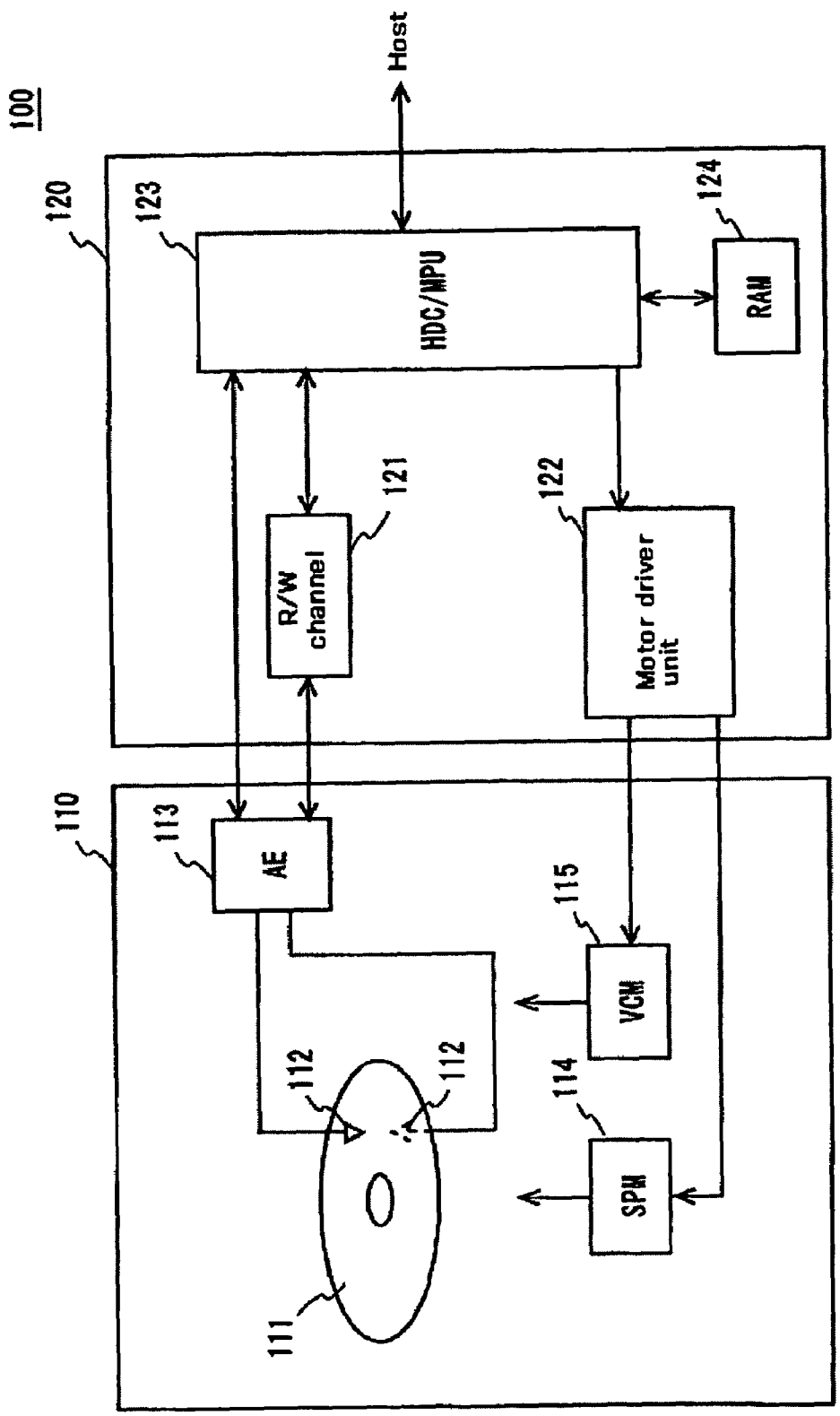
FIG. 1 is a block diagram showing a schematic configuration of an HDD according to an embodiment of the present invention.

A more specific embodiment applying the present invention is described in detail below with reference to the accompanying drawings. FIG. 1 shows a schematic configuration of a hard-disk drive (HDD) 100 according to the present embodiment.

As shown in FIG. 1, the HDD 100 includes in a frame 110, a magnetic disk 111 as an example of a medium, head element sections 112 serving as an example of a head, arm electronics (AE) 113, a spindle motor (SPM) 114, and a voice coil motor (VCM) 115. The HDD 100 also has a circuit board 120 fixed to an exterior of the frame 110. On the circuit board 120 are provided a read/write (R/W) channel 121, a motor driver unit 122, a hard-disk controller (HDC)/MPU integrated circuit 123 (hereinafter, referred to simply as the HDC/MPU 123), and a RAM 124 as an example of a memory.

Write data from an external host is received by the HDC/MPU 123 and then written onto the magnetic disk 111 via the R/W channel 121 and the AE 113. Also, the data stored on the magnetic disk 111 is read out by the head element section 112, and the data thus read out is output from the HDC/MPU 123 via the AE 113 and the R/W channel 121 to the external host.

Figure 2:
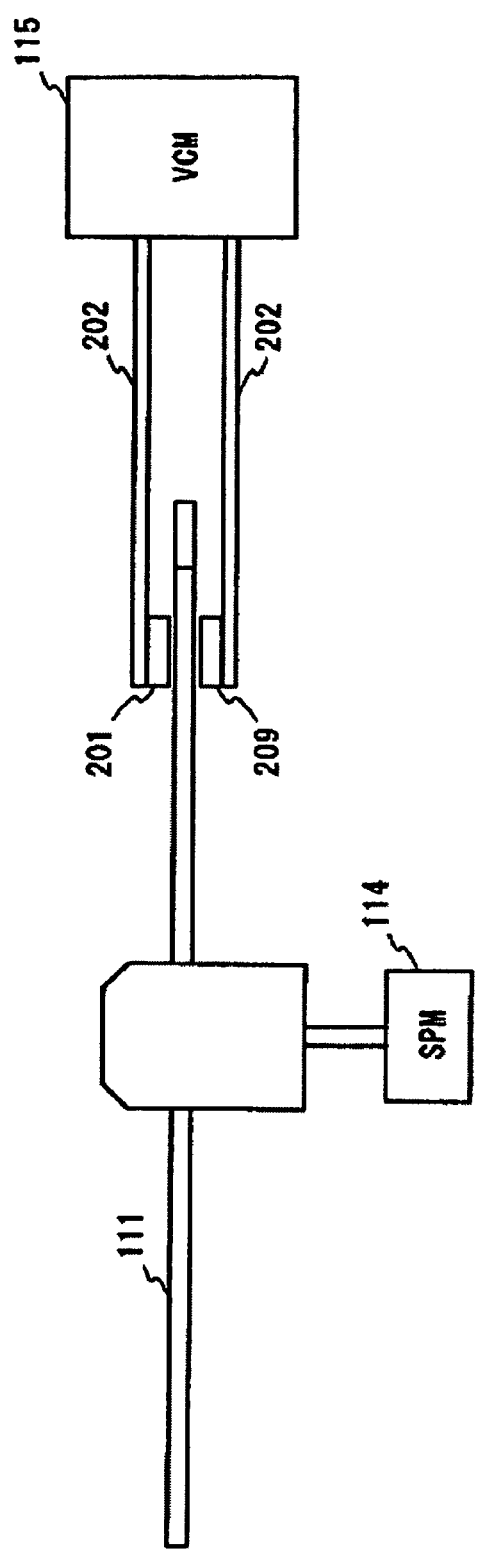
FIG. 2 is a diagram showing the driving mechanism of the magnetic disk and head element sections used in the above embodiment of the present invention.

Next, the elements constituting the HDD are described below. First, a driving mechanism of the magnetic disk 111 and that of the head element sections 112 are outlined below with reference to FIG. 2. The magnetic disk 111 is fixed to a spindle of the SPM 114. The SPM 114 is driven by the motor driver unit 122, and the SPM 114 rotates the magnetic disk 111 at a predetermined speed. The magnetic disk 111 has a data-recording surface on both sides, and a head element section 112 (not shown) is provided that is associated with each of the recording surfaces. Each of the head element sections 112 is fixed to a slider 201. The slider 201 is further fixed to a carriage 202. The carriage 202 is also further fixed to the VCM 115, and the VCM 115 moves the slider 201 and the associated head element section 112 by oscillating.

For data reading/writing from/onto the magnetic disk 111, the carriage 202 moves the associated head element section 112 to a data region present on the surface of the magnetic disk 111, when the disk is rotating. Oscillation of the carriage 202 moves the head element section 112 in a radial direction of the surface of the magnetic disk 111. Thus, the head element section 112 can access a desired region.

Typically, a write head and a read head are integrally formed at the head element sections 112. The write head converts an electrical signal into a magnetic field according to the type of data stored onto the magnetic disk 111. The read head reads back the magnetic field from the magnetic disk 111 and reconverts the magnetic field into the original electrical signal. A pressure due to viscosity of the air existing between the air bearing surface (ABS) of the slider 201 that faces the rotating magnetic disk 111 is balanced with the force applied in a direction of the magnetic disk 111 by the carriage 202. Thus, the head element sections 112 fly in the air with a fixed gap above the magnetic disk 111. This gap is called "head flying height". It suffices just to provide at least one magnetic disk 111, and a recording surface can be formed on one side of the magnetic disk 111 or on both sides.

Next, circuit blocks are described below referring to FIG. 1. The AE 113 selects, from the plurality of head element sections 112, one head element section 112 on which a data access operation is to be performed. The AE 113 next preamplifies, with a fixed gain, a signal read back by the selected head element section 112, and sends this read-back signal to the R/W channel 121. The AE 113 also transfers a write signal received from the R/W channel 121, to the selected head element section 112.

The R/W channel 121 performs a write process on the data transferred from the host. During the write process, the R/W channel 121 modulates into a code format the write data supplied from the HDC/MPU 123, then further converts the code-modulated write data into a write signal (electric current), and supplies this signal to the AE 113. Also, the R/W channel 121 performs a read process when supplying data to the host.

During the read process, the R/W channel 121 preamplifies to fixed amplitude the read signal supplied from the AE 113, extracts data from the read signal thus acquired, and decodes the data. The data read out includes user data and servo data. Decoded read data is supplied to the HDC/MPU 123.

The HDC/MPU 123 is a circuit having an MPU and an HDC integrated into a single chip. The MPU operates in accordance with the microcodes loaded into the RAM 124, and provides total control of the hard-disk drive 100. The total control includes positioning control of the head element sections 112, interface control, and defect management. The HDC/MPU 123 also executes necessary data processing. Coupled with a start of the hard-disk drive 100, the microcodes operating on the MPU and the data predetermined for control and data processing are loaded from the magnetic disk 111 or a ROM (not shown) into the RAM 124.

The HDC/MPU 123 has an interface function with respect to the host and receives the user data, read command, write command, and other commands transmitted from the host. Received user data is transferred to the R/W channel 121. In addition, the readout data from the magnetic disk, acquired from the R/W channel 121, is transmitted to the host. Furthermore, the HDC/MPU 123 performs an error checking and correction (ECC) process on the user data acquired from the host or read out from the magnetic disk 111.

The data read out via the R/W channel 121 includes user data and servo data. The HDC/MPU 123 provides positioning control of the head element sections 112, which use servo data. Control data from the HDC/MPU 123 is output to the motor driver unit 122. The motor driver unit 122 supplies a driving current to the VCM 115 in response to a control signal. The HDC/MPU 123 also conducts data read/write processes using the servo data.

Figure 3:
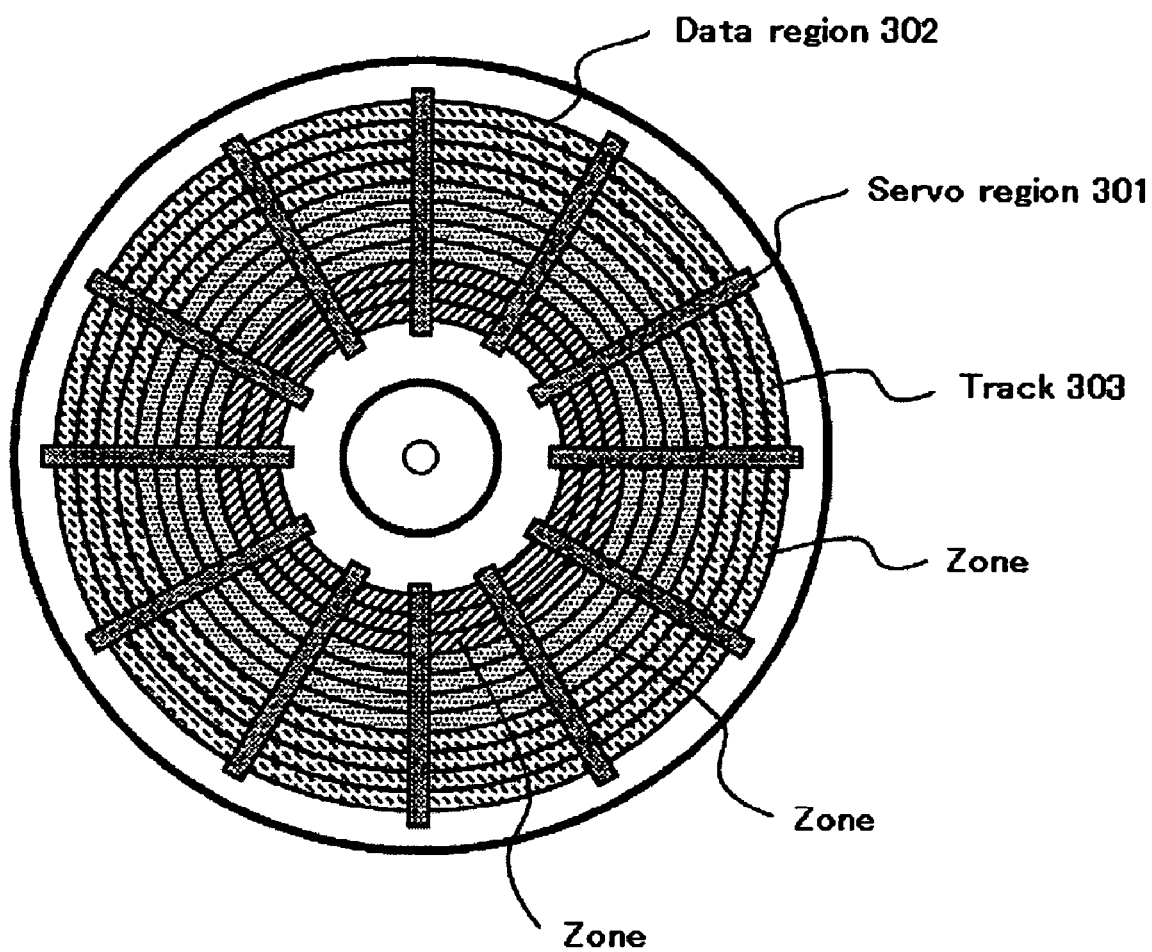
FIG. 3 is a diagram schematically showing a state of the data recorded on a recording surface of the magnetic disk according to the above embodiment of the present invention.

The data recorded on the magnetic disk 111 is described below with reference to FIG. 3. FIG. 3 schematically shows a state of the data recorded on a recording surface of the magnetic disk 111. As shown in FIG. 3, multiple servo regions 301 extending radially from the center of the magnetic disk 111 are each formed at predetermined angle intervals, and a data region 302 is formed between two adjacent servo regions 301. Servo regions 301 and data regions 302 are each provided in alternate positions at a predetermined angle. Servo data for positioning control of the head element sections 112 is recorded in each servo region 301. User data is recorded in each data region 302.

Multiple concentric tracks 303 each having a predetermined width in a radial direction are formed on the recording surface of the magnetic disk 111. Servo data and user data are recorded along the tracks 303. One track 303 between two tracks 303 has multiple data sectors as a recording unit of user data. Also, the track 303 is grouped into multiple zones radially on the magnetic disk 111. The number of sectors contained in one track 303 is set according to the particular number of associated zones. In FIG. 3, three zones are shown by way of example. Recording density can be improved by changing a recording frequency for each zone.

Figure 4:
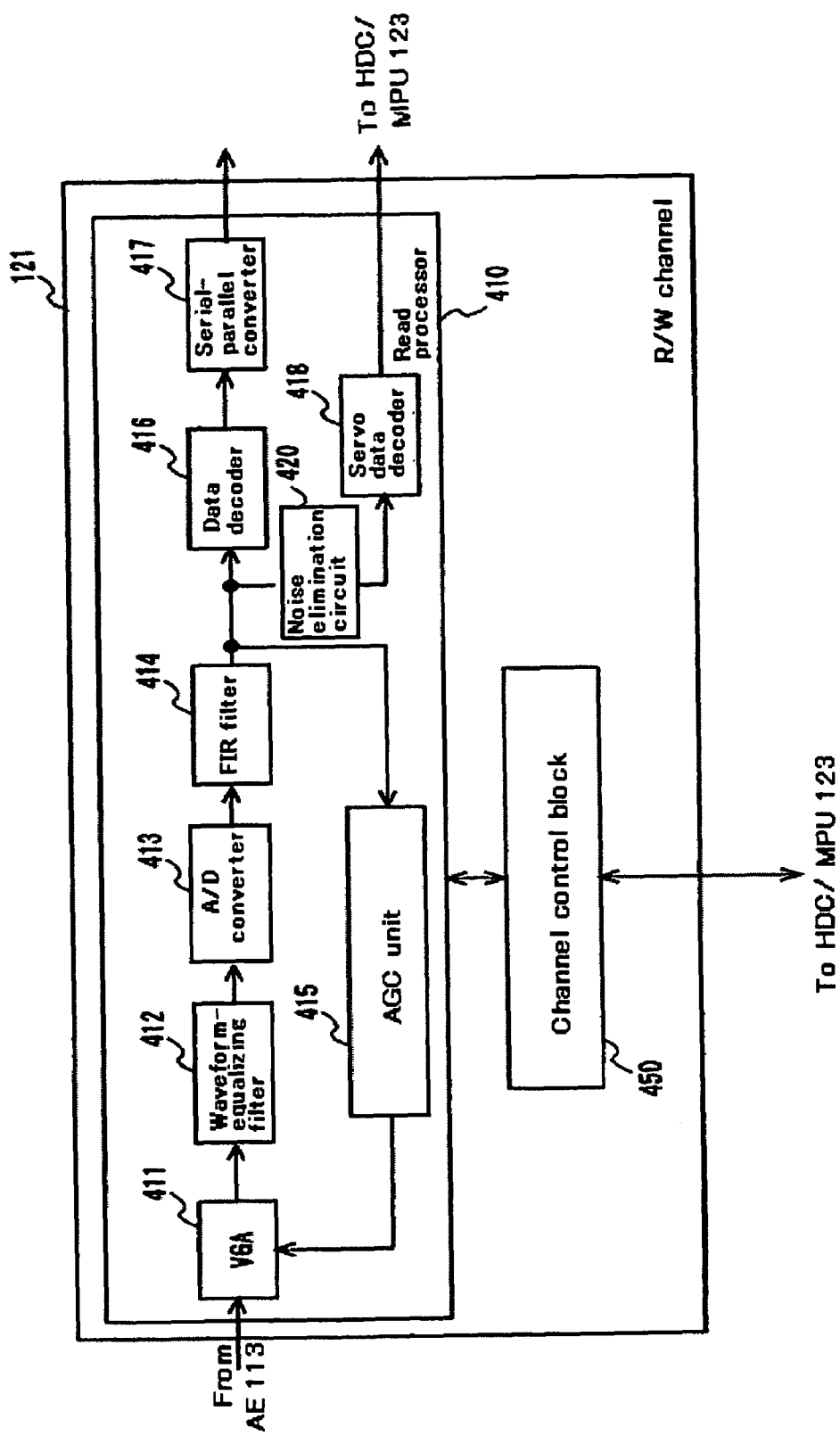
FIG. 4 is a block diagram showing a logical configuration related to the read process in the R/W channel used in the above embodiment of the present invention.

A read process in the R/W channel 121 is described below. FIG. 4 is a block diagram showing a logical configuration related to the read process in the R/W channel 121 according to the present embodiment. As shown in FIG. 4, the R/W channel 121 has a read processor 410 for performing a read process on the magnetic disk, and a channel control block 450 for controlling the read process by the read processor 410. The channel control block 450 can control a read process by setting parameters for the read processor 410. The channel control block 450 has a register and stores the parameters acquired from the read processor 410. In the present embodiment, gain data from an AGC (Auto Gain Control) unit 415, in particular, is stored into the register of the channel control block 450.

A read process for reading out data from the magnetic disk 111 is described below. As shown in FIG. 4, the read processor 410 has a VGA (Variable Gain Amp) 411, a waveform-equalizing filter 412, an A/D converter 413, an FIR (Finite Impulse Response) filter 414, an automatic gain control (AGC) unit 415, a data decoder 416, a serial-parallel converter 417, and a servo data decoder 418.

The VGA 411 changes a gain so that output becomes constant by control of the AGC unit 415. The waveform-equalizing filter 412 conducts waveform equalization of input analog signals. The A/D converter 413 samples and quantizes analog signals. The FIR filter 414, an example of a transversal filter, conducts transversal equalization of digital signals. The AGC unit 415 controls the VGA 411 so that a constant input voltage can be obtained. The data decoder 416 decodes and demodulates input data. The serial-parallel converter 417 converts input serial data into parallel data. The servo data decoder 418 decodes servo addresses of servo signals and then outputs the resulting data to the HDC/MPU 123.

The read signal, after being read back by the head element section 112 and preamplified with a fixed gain by the AE 113, is input to the VGA 411, which then amplifies the input signal to a signal level processed by the HDC/MPU 123. When the read-back signal relates to user data, to ensure that the amplified read-back signal falls within a fixed amplitude range, the AGC unit 415 automatically adjusts a gain following up a change in the signal level of the read-back signal, by conducting feedback control based on digital-like processing. When the read-back signal relates to servo data, a gain is determined on the basis of a beginning section of the servo signal and then the section thereof that follows the beginning section is amplified according to the determined constant gain.

The waveform-equalizing filter 412 has a low-pass filter function. The waveform-equalizing filter 412 conducts input signal noise elimination and signal waveform slimming equalization processes for later signal processing. An output from the waveform-equalizing filter 412 is converted into a digital signal during sampling and quantizing by the A/D converter 413. The output is input to the FIR filter 414.

The FIR filter 414 shapes an input waveform in order to restore data accurately and equalizes the input waveform to a desired waveform. The FIR filter 414 has its output signal input to the data decoder 416. The data decoder 416 activates a PRML (Partial Response Maximum Likelihood) processing circuit to process the waveform that has been equalized by the FIR filter, and generates an RLL (Run Length Limited) signal. Also, in accordance with a predetermined algorithm, the data decoder 416 determines the most probable data string of all those existing, from the positional relationship in the data strings. Furthermore, the data decoder 416 decodes the encoded RLL signal into the original signal. Serial data that the data decoder 416 has demodulated is converted into parallel data by the serial-parallel converter 417 and transferred to the HDC/MPU 123. For servo data, the servo data decoder 418 decodes the servo addresses of the servo signals, which were waveform-shaped by the FIR 414, and outputs decoding results to the HDC/MPU 123. The burst signals contained in the servo data read out by the servo data decoder 418 are sent to the HDC/MPU 123, which then conducts driving control of the VCM 115, based on the burst signals, via the motor driver unit 122. Thus, seek control is conducted to move the head to a desired position, and subsequently, head positioning control is conducted to further move the head from the desired position to a position within a fixed range.

Figure 5:
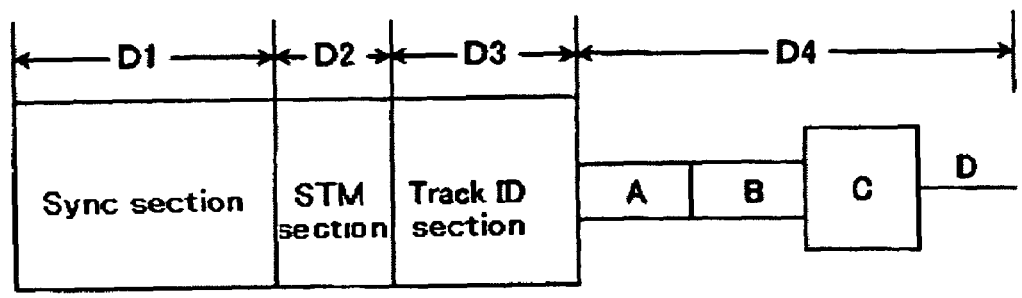
FIG. 5A is a schematic diagram showing an example of servo data, and 5B is a diagram explaining burst patterns A, B, C, D of burst signals.
Figure 5:
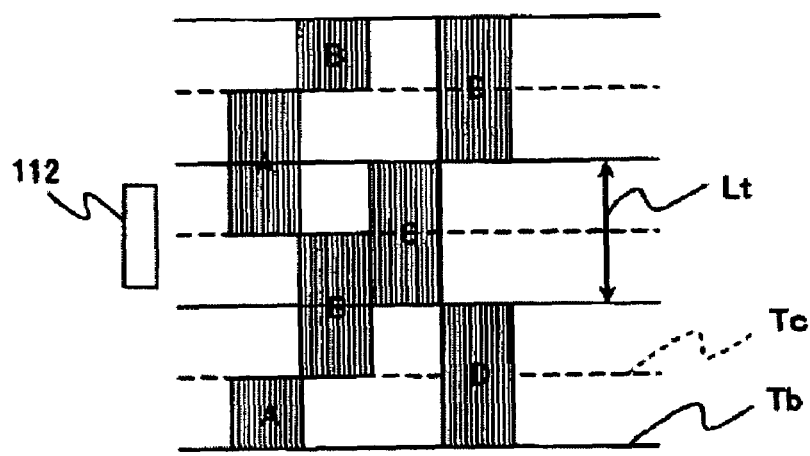

Next, the servo signals stored on the magnetic disk 111 are described below. On the disk that is a recording medium, servo data is written on concentric tracks to follow up the data-recording magnetic head. The servo data is written in multiple places on the tracks, and as shown in FIG. 5A, is formed of well-known regions. These regions include, for example, a Sync section D1 for recording data-synchronizing Sync data, an STM (Servo Track Mark) section D2 for recording a servo mark, which indicates a beginning of the servo data, a track ID section D3 that has the position information indicating what number track a particular track is, and a Burst section D4 for recording the burst pattern signals used for more precise position control. The Sync section D1 includes the servo AGC data for making amplitude constant by adjusting an amplification ratio of a signal amplifier before the servo data is read out.

Four types of burst patterns, for example, as shown in FIG. 5B, patterns A, B, C, and D, are recorded in the Burst section D4. Each of these burst patterns is read back by the head, and changes in the amplitude of the resulting read-back signals (burst signals) are digitized and then used for purposes such as tracking control (track following) of the head element sections 112.

When a track center is taken as Tc, a track boundary as Tb, and track width as Lt, burst patterns A and B are signals recorded at fixed periods alternately from track center Tc to one of two adjacent track centers Tc first and then to the other track center Tc. Burst patterns C and D are signals each recorded at fixed periods in one track, and these signals are recorded in different tracks. The burst patterns A to D are each recorded repeatedly at about 10 periods in an extending direction of tracks. The head element sections 112 are controlled to take up a position of track center Tc. A shift in the position of the head can be corrected for using an error signal generated according to a particular difference between the integral values obtained by, for example, integrating servo signal waveforms of the burst patterns A and B. Positioning is also possible by using the burst patterns C and D. In addition, position control is possible by using a peak hold scheme intended to detect the position of the head from peak values of the servo signals.

Here, the present embodiment includes a noise elimination circuit 420 for eliminating the disturbance-caused ESD noise superimposed on the servo signals. The noise elimination circuit 420 eliminates only noise-superimposed burst signals from the burst signals included in the servo data that was read out, and outputs only noise-eliminated data that is data obtained after the noise elimination, to the servo data decoder 418 of the following stage.

More specifically, a predetermined number of periods of integral data of absolute values of burst signal waveforms for each period is stored first. Next, a maximum value or multiple values including the maximum value, and a minimum value or multiple values including the minimum value, in the predetermined number of periods of integral data when arranged in order of the magnitude thereof, are removed since each such value is for signals most likely to contain superimposed noise. After this, only the remaining data is output as noise-eliminated data.

Figure 6:
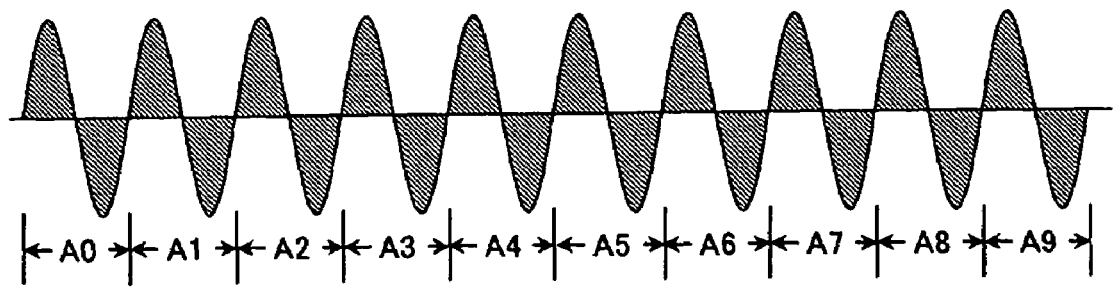
FIG. 6 is a schematic diagram showing an example of a burst signal.

FIG. 6 is a schematic showing a burst signal. Description is given below of a case in which, for example, results of reading out the burst signal A of the above-described four types of burst signals are obtained as the signal waveform shown in FIG. 6. As shown in FIG. 6, about 10 periods of recording data on a signal of a fixed period is recorded in one burst signal. In the noise elimination circuit 420, a burst signal that has been read out first has its absolute value integrated for each period in order to calculate integral values of each period. For example, when burst signals for 10 periods are read out, the 10 periods of integral data are rearranged in order of the magnitude thereof. Next, a predetermined number of burst signals (in the present embodiment, for example, two in order of the magnitude of each of the values within the integral data, from the greatest value) and a predetermined number of burst signals (in the present embodiment, for example, two in order from the smallest value) are removed. Only the remaining six burst signals are used as noise-eliminated data, whereby, if a significant amount of disturbance-caused ESD noise or the like occurs for a brief time, any burst signals affected by the noise can be eliminated.

For example, an α-trimmed mean filter based on order statistics can be used as an example of a circuit element for arranging integral values in order of the magnitude thereof and removing a predetermined number of burst signals in order of the magnitude of their values from both the greatest and smallest ones. The α-trimmed mean filter provides signal filtering with respect to a signal string obtained by rearranging the signal values in order of the magnitude thereof, and an output from this filter is represented by the following expression (1):

[Numerical Expression 1]

$$y(i) = \frac{1}{N(1-2\alpha)} \sum_{k=\alpha N+1}^{N-\alpha N} x_{(k)}(i) \quad (1)$$

where a relationship of $0 \leq \alpha \leq (N-1)/2N$ exists and $\alpha N$ is an integer.

In the above expression (1), N denotes the number of samplings, wherein, in a general α-trimmed mean filter, the signal itself (e.g., the output signal from the foregoing FIR filter 414) is used as "x(i)", whereas in the present embodiment, the value obtained by integrating the absolute values of the output signals of the FIR filter 414 for each period is used as "x(i)".

As shown in expression (1), the α-trimmed mean filter outputs the signal value, i.e., in the present embodiment, the mean value obtained by removing samplings close to first and Nth ones when each sampling is rearranged in order of the magnitude of the integral value. In the above example, for 10 periods of servo signal data (N=10), when the integral values of burst signals for each period are calculated and rearranged in order of the magnitude of the integral value, since N=10, α=1/5 must be established to output only data, except two values in order from the greatest value and two values in order from the smallest value, i.e., to make αN equal to 2. Hence, a signal having the mean value of the third to eighth signals (k=3 to 8), except the greatest two and smallest two integral values existing when the integral values of the waveform absolute values in the 10 periods of servo signal data are rearranged in order of area, is output as a noise-eliminated burst signal.

That is to say, the integral values of the absolute values of the signal waveforms for each period are taken as A0 to A9 in FIG. 6. At this time, when these area values A0 to A9 satisfy the relationship of expression (2) below, an output F of the α-trimmed mean filter having a value of α=1/5 is represented by the following expression (3):

[Numerical Expression 2]

$$A9 < A6 < A4 < A5 < A1 < A2 < A0 < A7 < A3 < A8 \quad (2)$$

[Numerical Expression 3]

$$F = (A4 + A5 + A1 + A2 + A0 + A7)/6 \quad (3)$$

While burst signal A has been described above, detailed and accurate position information can likewise be obtained for all other burst signals, B, C, and D, by retaining the area rate similarly.

The number of readout periods, namely N, is usually the same between burst signals A to D. Accordingly, when the number of integral values to be removed from all those within the signal burst data, which was read out for the number of periods, i.e., the predetermined number of integral values from the maximum value and the predetermined number of integral values from the minimum value are set to become equal, the number of integral values included in the form of noise-eliminated data also becomes the same. In this case, therefore, the noise-eliminated data, not the mean of the values for each period, may be output as it is. For example, noise-eliminated burst signals may be first sent to the servo data decoder 418 of the following stage, instead of being averaged for each period, and then averaged using the servo data decoder 418. In addition, when the number of periods of the integral values of the absolute values of each noise-eliminated burst signal can be set to become equal to the same predetermined number of integral values, it may be allowed, for example, to output to the servo data decoder 418 the value obtained by adding the above-mentioned predetermined number of noise-eliminated integral values, and then to make the servo data decoder 418 conduct positioning control by using the value obtained from the above additions.

The foregoing description assumes that in an α-trimmed mean filter, for example, the predetermined number of integral values from the maximum value and minimum value when all integral values are rearranged in order of the magnitude thereof are removed. However, when it can be expected that the integral values of the absolute values of noise-superimposed waveforms become greater than a normal value according to a particular purpose of processing and/or the type of noise to be eliminated, the remainder obtained by removing a maximum value of integral value (An) or removing the predetermined number of values from the maximum value may be used as noise-eliminated data. For example, the noise arising from instability of the head appears as either positive or negative noise, depending on particular specifications of the device. If a signal having either positive or negative noise superimposed thereon is input to the noise elimination circuit 420 via a high-pass filter (coupling capacitor), the noise-superimposed signal is expected to increase in the integral value of its absolute value. Accordingly, removing only the maximum value can eliminate the noise.

Similarly, when the integral values of the absolute values of noise-superimposed waveforms can be expected to become smaller than a normal value, the remainder obtained by removing a minimum value of integral value An or removing the predetermined number of values from the minimum value may be used as noise-eliminated data.

Figure 7:
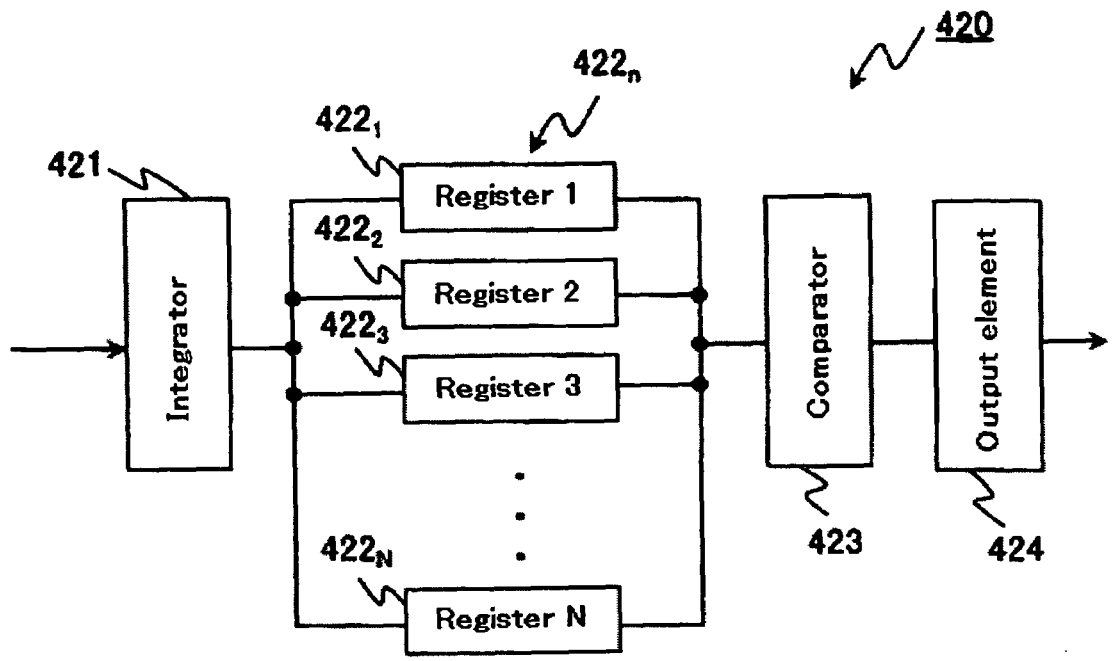
FIG. 7 is a block diagram showing a more specific example of the noise elimination circuit used in the above embodiment of the present invention.

Next, an example of such noise elimination circuit as described above is described below. FIG. 7 is a block diagram showing a more specific example of a noise elimination circuit according to the present embodiment. As shown in FIG. 7, a noise elimination circuit 420 eliminates noise from an N number of periods of burst signal data. This circuit includes: an integrator 421 that receives the N number of periods of burst signal data, integrates absolute values of waveforms for each period, and outputs integration results; registers 4221 to 422N (hereinafter, referred to as registers 422n) that each store the integral value obtained by integrating the absolute values of the waveforms for each period; a comparator 423 that compares the integral values stored in each register 422n, rearranges the integral values in order of their magnitude, and outputs the remainder obtained by removing, from the rearranged data, only a predetermined number of integral values in order of the magnitude thereof from the smallest value and a predetermined number of integral values in order of the magnitude thereof from the greatest value; and an output element 424 that receives an output from the comparator 423, retains an average value of each period, and outputs the average value to the servo data decoder 418 of the following stage.

While the foregoing description assumes that the output element 424 has an averaging function that can also output the average value derived by taking an average of the remainder existing when the greatest and smallest integral values are removed, it may also be allowed to output the value obtained by removing the greatest and smallest integral values and adding the remaining data, or to output each integral value sequentially as it is. In these cases, there is no need to provide the output element 424 for retaining an average of the above remainder. Also, if the comparator 423 can be used to eliminate the intended noise and the like by, as described above, removing from all data, for example, only one integral value in normal ascending order of, or in descending order of, the magnitude of the data, namely, only the maximum value or the minimum value, only the greatest value or the smallest value can be selectively removed and then output from the comparator 423.

Figure 8:
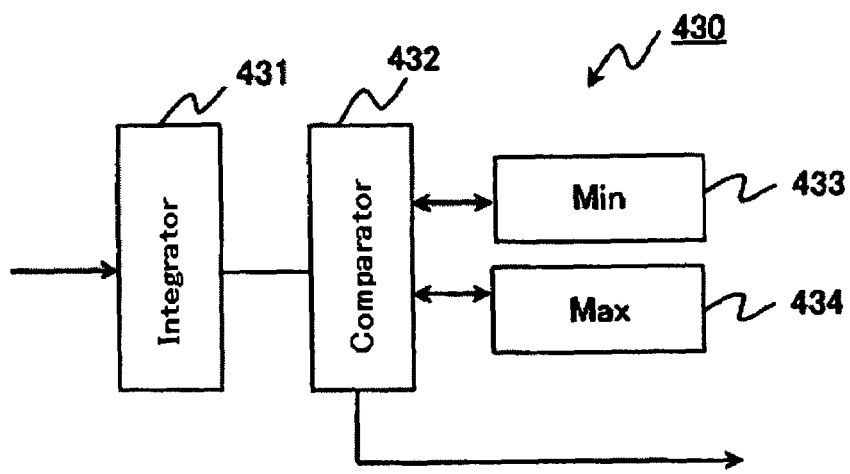
FIG. 8 is a block diagram showing another specific example of the noise elimination circuit used in the above embodiment of the present invention.

In addition, the circuit composition can be further simplified in the configuration where one maximum value and one minimum value only are removed as in the foregoing. That is, when one maximum value and one minimum value are to be removed, integral values of the servo signals that were read out do not need to be compared with one another or rearranged in order of their magnitude. FIG. 8 is a block diagram showing another specific example of a noise elimination circuit according to the present embodiment. A noise elimination circuit 430 shown in FIG. 8 is a circuit that removes maximum and minimum values from a predetermined number of frequencies of integral data of waveforms. The noise elimination circuit 430 applies to an example in which, in expression (2) shown above, α=1/10 if N=10.

As shown in FIG. 8, the noise elimination circuit 430 includes: an integrator 431 that receives burst signals, integrates waveform values on a period-by-period basis, and sequentially outputs integration results; a register (Min) 433 as a second storage element for holding a minimum integral value of signal waveforms for each period, and a register (Max) 434 as a first storage element for holding a minimum integral value of the signal waveforms; and a comparator 432 for sequentially receiving the integral values obtained using the integrator 431, and then comparing these integral values with the values stored within the register (Min) 433 and the register (Max) 434.

The comparator 432, after receiving first and second integral values, compares the values in terms of magnitude and stores comparison results as a comparison minimum value Amin and a comparison maximum value Amax into the register (Min) 433 and the register (Max) 434, respectively. The comparator 432 further compares an integral value of the burst signal subsequently received (hereinafter, this value is referred to as input integral value An), to the comparison minimum value Amin stored within the register (Min) 433. If the input integral value An is smaller, the comparator 432 interchanges the comparison minimum value Amin within the register (Min) 433 and the input integral value An, and uses the input integral value An as a minimum value for comparison. If the input integral value An is greater than the comparison minimum value Amin, the input integral value An is compared with the comparison maximum value Amax stored within the register (Max) 434. And if the input integral value An is greater than the comparison maximum value Amax, this comparison maximum value Amax stored within the register (Max) 434 is interchanged with the input integral value An. In other words, if the input integral value An is greater than the comparison minimum value Amin, but smaller than the comparison maximum value Amax, the input integral value An is output as it is.

If the input integral value An is the same as the comparison minimum value Amin or the comparison maximum value Amax, the input integral value An may be interchanged with the value stored within the register (Min) 433 or the register (Max) 434. Of course, the input integral value An may also be compared with the comparison maximum value Amax before being compared with the comparison minimum value Amin. Thus, when integral values A0 to A10 are input, the data actually output will be signal data, except data associated with the greatest integral value and data associated with the smallest integral value. Alternatively, as shown in FIG. 7, an output element may be provided to calculate an average from the data sequentially output, and then output the average.

While the above-mentioned noise elimination process has been described assuming that as shown in FIG. 4, the noise elimination process is performed by the noise elimination circuit provided at the stage preceding the servo data decoder 418, this elimination process may be performed inside the servo data decoder 418. Instead, the noise elimination process may, of course, be performed inside the HDC/MPU 123 that conducts position control of the head, based on the burst signals sent from the servo data decoder 418. More specifically, when integral values of the burst signals A to D used for positioning control, for example, are defined as $S_A$ to $S_D$, a value such as $(S_A-S_B)/(S_A+S_B)$ will be used to control positioning. In this case, it suffices just for the above-mentioned noise elimination process to be performed during processing up to the stage preceding the calculation of that value. In the above, $S_A$ to $S_D$ can each be an average value or a predetermined number of periods of integral data added.

Figure 9:
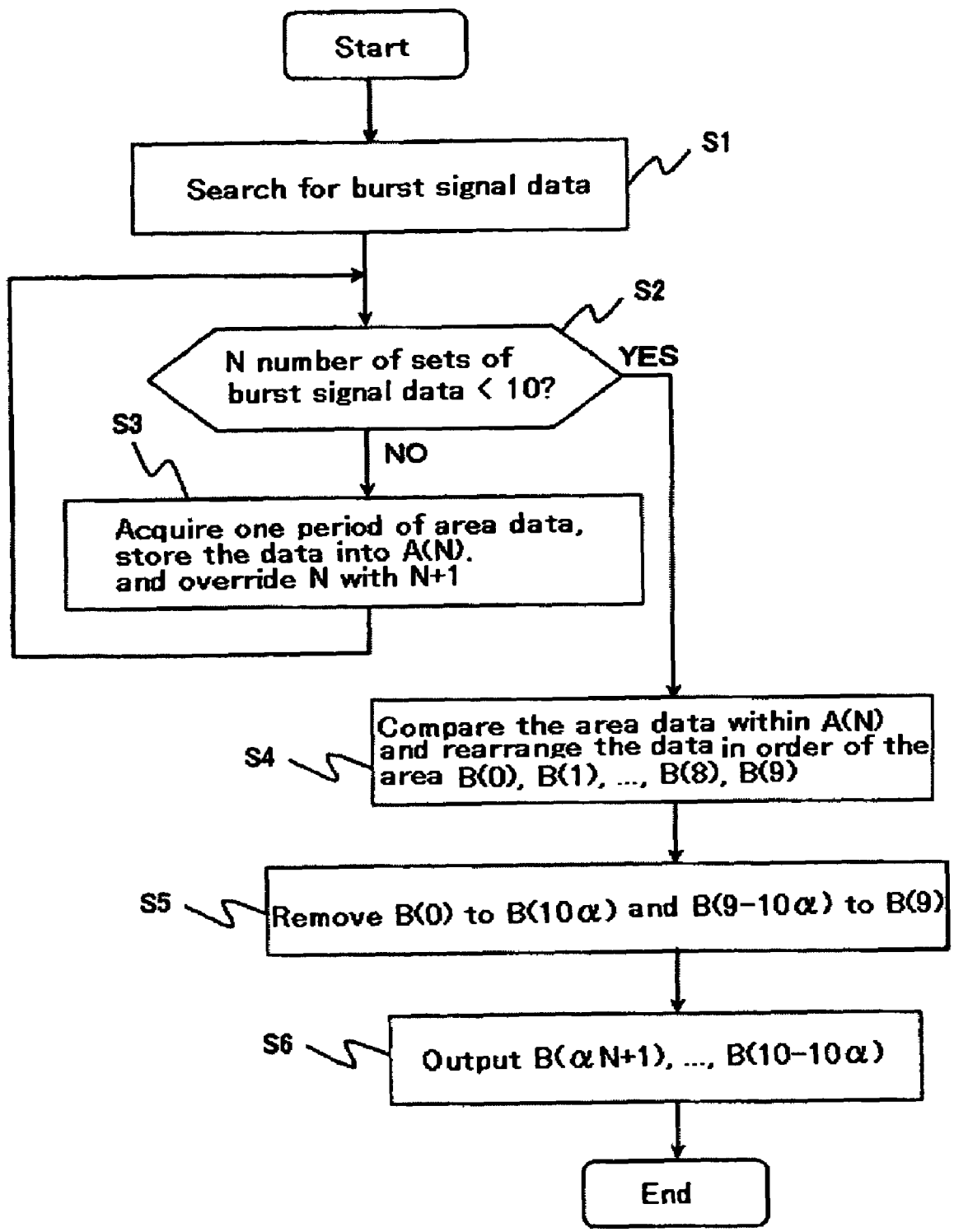
FIG. 9 is a flowchart showing a noise elimination method that uses an α-trimmed mean filter.
Figure 10:
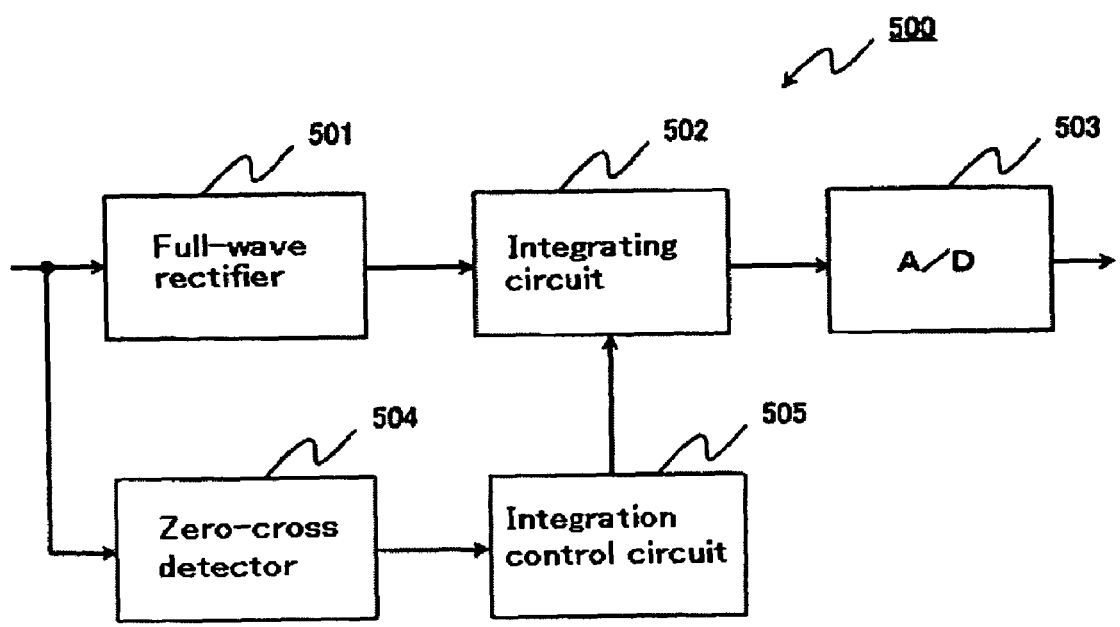
FIG. 10 is a block diagram showing the servo detection circuit described in Patent Document 2.

Next, execution of a noise elimination process inside the HDC/MPU 123, for example, is described below. FIG. 9 is a flowchart showing a noise elimination method that uses an α-trimmed mean filter. As shown in FIG. 9, burst signals to be read in are searched for first (step S1), and after the burst signals have been read in, whether the current number of burst signals is smaller than an N number of burst signals to be read in is determined (step S2). If the current number of burst signals is smaller than the N number of burst signals, area data associated with an absolute value of a signal waveform for one period is acquired, then integral values are stored into A(N), and the N number of burst signals is replaced with N+1. On completion of reading of the N number of burst signals (step S2: YES), the integral values associated with all data stored in A(N) are compared and rearranged in order of the magnitude of the integral values (step S4). These integral values are taken as B(N)=B(0), B(1), etc. up to B(8), B(9).

After this, all data from the minimum data down to the Nαth data (if N=10, the 10αth data) is removed in the order where each integral value increases in magnitude. All data from the (N(1−α)+1)th data (if N=10, the 9−10αth data) down to the Nth data in the order where each integral value increases in magnitude, is further removed (step S5). That is, if N=10, B(0) to B(10α) and B(9−10α) to B(9) are removed and the remaining data B([N+1]to B(8−10α) is output as noise-eliminated data.

Here, as described above, when two integral values in descending order of the magnitude of data, and two others in normal ascending order of the magnitude of the data are to be removed prior to output, α may be set to have a value of 1/5. When minimum and maximum integral value are to be removed, a may be set to have a value of 1/10.

In the present embodiment, the noise elimination circuit compares each period of area data of multiple burst signals and removes, from the area data, maximum and minimum integral values or a predetermined number of values in order from the maximum value and a predetermined number of values in order from the minimum value. Accordingly, it is possible to obtain burst signals from which the data containing noise due to disturbance-caused ESD has been eliminated. The noise elimination process requires only retaining multiple integral values of the absolute values of burst signal waveforms and removing maximum and minimum values from those integral values. The noise elimination process can therefore be conducted very easily and rapidly in comparison to the conventional method. In the HDD 100, execution of positioning control of the head, based on servo signals that are such noise-eliminated data signals, allows accurate positioning of the head.

The present invention is not limited only to the above-described embodiment and it will be obvious to persons skilled in the art that various changes may be made without departing from the scope of the invention. While, for example, in the above-described embodiment, description has been given assuming that the positioning of the head is controlled using the integral value obtained by integrating the absolute values of the waveforms of servo signals, the positioning may be controlled by detecting the position of the head by use of peak amplitude values of the servo signals. Amplitude can be obtained by, for example, as shown in expression (4) below, multiplying a signal "x(nT)", where T is a sampling period, by a sine wave of the same frequency and taking an average of the products derived.

[Numerical Expression 4]

$$\Sigma x(nT)\sin nT \omega \qquad (4)$$

Alternatively, a square root of the above expression may be taken. In this case, it is also possible to calculate multiple peak amplitude values from each servo signal, rearrange these values in order of their magnitude, and use, as servo data for tracking, only a peak value left by removing from those amplitude values a predetermined number of values in order from the greatest value and/or a predetermined number of values in order from the smallest value. Thus, even if noise is superimposed on signals near peaks for reasons such as a disturbance, the noise can be eliminated for improved head-positioning accuracy.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims alone with their full scope of equivalents.

The invention claimed is:

1. A disk device that controls positioning of a head in accordance with a servo signal containing a plurality of burst signals recorded in a servo region located on a disk, said disk device comprising:
   a noise elimination block configured to retain a predetermined number of periods of integral data of absolute values of waveforms for each period in the burst signals read out by said head, and output a remainder as noise-eliminated data obtained by removing a maximum value and/or a minimum value thereof from said predetermined number of periods of integral data;
   a controller configured to control position of said head in accordance with said noise-eliminated data; and
   an α-trimmed average filter configured to receive integral data of absolute values of waveforms for each period in said burst signals as said noise elimination block.

2. The disk device according to claim 1, wherein said noise elimination block outputs said remainder as noise-eliminated data obtained by removing a maximum value and a minimum value from said predetermined number of periods of integral data.

3. The disk device according to claim 1, wherein said noise elimination block obtains said noise-eliminated data by making an arranged data from said predetermined number of periods of integral data in order of the magnitude thereof from a maximum value to a minimum value and by removing a predetermined number of periods of integral data from said arranged data in order of decreasing magnitude from said maximum value and from a predetermined number of integral values in order of increasing magnitude from said minimum value.

4. The disk device according to claim 2, wherein said noise elimination block further comprising:
an integral data storing area to retain a predetermined number of periods of integral data of absolute values of waveforms for each period in said burst signals;
a comparator configured to compare with one another said integral values constituting said predetermined number of periods of integral data retained by said an integral data storing area, and output said remainder as said noise-eliminated data obtained by removing a maximum value and a minimum value of integral data from said predetermined number of periods;
a first storage element configured to store only said maximum value of all said predetermined number of periods of integral data; and
a second storage element configured to storing only said minimum value of all said predetermined number of periods of integral data;
said comparator being configured to: compare two integral values included in said predetermined number of periods of integral data; store the larger of said two values into said first storage element, and store the smaller into said second storage element; compare a remainder with said integral values stored in said first and second storage elements; and if said remainder is greater than said integral value stored in said first storage element, replace this integral value with said remainder, if said remainder is smaller than said integral value stored in said second storage element, replace this integral value with said remainder, or if said remainder is smaller than said integral value stored in said first storage element and greater than said integral value stored in said second storage element, output said remainder as said noise-eliminated data.

5. The disk device according to claim 1, wherein said noise elimination block includes:
an integral data storing area to retain a predetermined number of periods of integral data of absolute values of waveforms for each period in said burst signals; and
a comparator configured to compare with one another said integral values constituting said predetermined number of periods of integral data retained by said an integral data storing area, and output said remainder as said noise-eliminated data obtained by removing a maximum value and/or a minimum value of periods of integral data from said predetermined number thereof.

6. The disk device according to claim 1, wherein said noise elimination block includes:
an integral data storing area to retain a predetermined number of periods of integral data of absolute values of waveforms for each period in said burst signals;
a comparator configured to compare with one another said integral values constituting said predetermined number of periods of integral data retained by said an integral data storing area, and output said remainder as said noise-eliminated data obtained by removing a maximum value and/or a minimum value from said predetermined number of periods of integral data; and
an output element configured to average outputs from said comparator on a period-by-period basis and output a result of the averaging, as noise-eliminated data.

7. A disk device that controls positioning of a head in accordance with a servo signal containing a plurality of burst signals recorded in a servo region located on a disk, said disk device comprising:
a noise elimination block configured to retain a predetermined number of amplitude values on said burst signals read out by said head, and output a remainder as noise-eliminated data obtained by removing a maximum value and/or a minimum value from said predetermined number of amplitude values;
a controller configured to control position control of said head in accordance with said noise-eliminated data; and
an α-trimmed average filter configured to receive amplitude values on said burst signals as said noise elimination block.

8. A method for positioning a head of a disk device controlling the position of said head in accordance with a servo signal containing a plurality of burst signals recorded in a servo region located on a disk, said method comprising:
retaining a predetermined number of periods of integral data of absolute values of waveforms for each period in said burst signals read out by said head;
comparing said integral values constituting said predetermined number of periods of integral data with one another;
outputting a remainder as noise-eliminated data obtained by removing a maximum value and/or a minimum value from said predetermined number of periods of integral data; and
controlling the positioning of said head in accordance with said noise-eliminated data.

9. The method for positioning a head according to claim 8 further comprising:
outputting said remainder as noise-eliminated data obtained by making an arranged data from said predetermined number of periods of integral data in order of the magnitude thereof from a maximum value to a minimum value and by removing a predetermined number of integral values from said arranged data in order of decreasing magnitude from said maximum value and a predetermined number of integral values in order of increasing magnitude from said minimum value.

10. The method for positioning a head according to claim 8 further comprising:
outputting said remainder obtained by making an arranged data from said predetermined number of periods of integral data in order of the magnitude thereof from a maximum value to a minimum value and by removing a predetermined number of integral values in order of decreasing magnitude from said maximum value from said arranged data and a predetermined number of integral values in order of increasing magnitude from said minimum value; and
outputting noise-eliminated data by averaging said obtained remainder of each period.

11. The method for positioning a head according to claim 8 further comprising:
retaining a predetermined number of periods of integral data of absolute values of waveforms for each period in said burst signals;

comparing two integral values of said predetermined number of periods of integral data of absolute values;
storing the larger integral data into a first storage element;
storing the smaller integral data into a second storage element;
comparing integral data stored into said first storage element and said second storage element with a remainder of said predetermined number of periods of integral data; and,
replacing said reminder in said first storage element instead of stored data, if said remainder is greater than said integral value stored in said first storage element;
replacing said reminder in said second storage element instead of stored data, if said remainder is smaller than said integral value stored in said second storage element;
outputting said reminder as said noise-eliminated data, if said reminder is smaller than said integral value stored in said first storage element and greater than said integral value stored in said second storage element.

12. A method for positioning a head of a disk device conducting positioning control of a head in accordance with a servo signal containing a plurality of burst signals recorded in a servo region located on a disk, said method comprising:
retaining a predetermined number of amplitude values of said burst signals read out by said head;
comparing said predetermined number of amplitude values of said burst signals with one another;
outputting as noise-eliminated data a remainder obtained by removing a maximum value and/or a minimum value from said predetermined number of amplitude values; and
controlling the positioning of said head in accordance with said noise-eliminated data.

13. A signal-processing circuit for processing a plurality of burst signals recorded in a servo region located on a disk in order to conduct positioning control of a head, said circuit comprising:
an integral data storing area to retain a predetermined number of periods of integral data of absolute values of waveforms for each period in said burst signals read by said head; and
an output element configured to output as noise-eliminated data a remainder obtained by removing a maximum value and/or a minimum value from said predetermined number of periods of integral data, wherein said output element outputs as noise-eliminated data said remainder obtained by removing a predetermined number of integral values in order of decreasing magnitude from said maximum value from said integral data and a predetermined number of integral values in order of increasing magnitude from said minimum value when said integral data is arranged in order of the magnitude thereof from a maximum value to a minimum value.

14. The signal-processing circuit according to claim 13 further comprising:
wherein said output element is configured to average the integral values within said remainder.

15. A signal-processing circuit for processing a plurality of burst signals recorded in a servo region located on a disk in order to conduct positioning control of a head, said circuit comprising:
an amplitude calculator configured to retain a predetermined number of amplitude values of said burst signals read by said head; and
an output element configured to output a remainder as noise-eliminated data obtained by removing a maximum value and/or a minimum value from said predetermined number of amplitude values calculated by said amplitude calculator,
wherein said output element outputs as noise-eliminated data said remainder obtained by removing a predetermined number of amplitude values in order of decreasing magnitude from said maximum value and a predetermined number of amplitude values in order of increasing magnitude from said minimum value when said amplitude values are arranged in order of the magnitude thereof from a maximum value to a minimum value.

16. The signal-processing circuit of claim 15, wherein the amplitude values are the peak amplitude values of said burst signals.

17. The signal-processing circuit of claim 15, wherein the amplitude values are derived from a function of the peak amplitude values of said burst signals.

* * * * *